United States Patent
Jankowski et al.

(10) Patent No.: US 8,813,173 B2
(45) Date of Patent: Aug. 19, 2014

(54) MOBILE COMMUNICATION DEVICE SURVEILLANCE SYSTEM

(75) Inventors: Peter A. Jankowski, Rancho Sante Fe, CA (US); Daniel T. Petkevich, Solana Beach, CA (US); Rand D. Anderson, Cardiff, CA (US); Brett J. Going, San Diego, CA (US)

(73) Assignee: Next Level Security Systems, Inc., Carlsbad, CA (US)

( * ) Notice: Subject to any disclaimer, the term of this patent is extended or adjusted under 35 U.S.C. 154(b) by 0 days.

(21) Appl. No.: 13/335,540

(22) Filed: Dec. 22, 2011

(65) Prior Publication Data

US 2013/0167190 A1    Jun. 27, 2013

(51) Int. Cl.
| | | |
|---|---|---|
| *G06F 17/00* | (2006.01) | |
| *H04L 29/08* | (2006.01) | |
| *H04W 24/00* | (2009.01) | |
| *H04W 12/06* | (2009.01) | |

(52) U.S. Cl.
CPC .............. *H04W 24/00* (2013.01); *H04W 12/06* (2013.01); *H04L 67/125* (2013.01)
USPC ........................................................ 726/1

(58) Field of Classification Search
USPC ............................................................ 726/1
See application file for complete search history.

(56) References Cited

U.S. PATENT DOCUMENTS

| | | | |
|---|---|---|---|
| 2001/0034754 A1* | 10/2001 | Elwahab et al. .............. 709/201 |
| 2004/0136547 A1 | 7/2004 | Anderson, Jr. | |
| 2005/0216302 A1* | 9/2005 | Raji et al. .......................... 705/1 |
| 2005/0267935 A1 | 12/2005 | Gandhi et al. | |
| 2007/0005736 A1* | 1/2007 | Hansen et al. ................. 709/220 |
| 2007/0127508 A1 | 6/2007 | Bahr et al. | |
| 2008/0221715 A1* | 9/2008 | Krzyzanowski et al. ....... 700/90 |
| 2009/0021585 A1 | 1/2009 | Ko et al. | |
| 2009/0070681 A1 | 3/2009 | Dawes et al. | |
| 2009/0315972 A1* | 12/2009 | Rensin et al. .............. 348/14.02 |
| 2010/0011432 A1* | 1/2010 | Edery et al. ...................... 726/11 |
| 2010/0015912 A1 | 1/2010 | Tucker | |
| 2010/0218248 A1* | 8/2010 | Nice et al. ........................ 726/12 |
| 2010/0318685 A1 | 12/2010 | Kraus et al. | |

FOREIGN PATENT DOCUMENTS

WO    WO-2013/096004 A1    6/2013

OTHER PUBLICATIONS

International Application Serial No. PCT/US2012/068936, International Search Report mailed Feb. 26, 2013, 2 pgs.
International Application Serial No. PCT/US2012/068936, Written Opinion mailed Feb. 26, 2013, 10 pgs.

* cited by examiner

*Primary Examiner* — Kambiz Zand
*Assistant Examiner* — Abiy Getachew
(74) *Attorney, Agent, or Firm* — Schwegman Lundberg & Woessner, P.A.

(57) ABSTRACT

A mobile communication device surveillance system is described. The system includes a gateway, a web server, a wireless mobile communication device, and a client device. The web server introduces the wireless mobile communication device to a gateway. The gateway authenticates the wireless mobile communication device. The gateway receives media data from the wireless mobile communication device and monitoring data from a security device connected to the gateway. The gateway aggregates the media data and the monitoring data, and communicates the aggregated data to the client device authenticated with the gateway.

20 Claims, 9 Drawing Sheets

| | GATEWAY 500 | | |
|---|---|---|---|
| API | WIRELESS MOBILE COMMUNICATION DEVICE API 502 | ACCESS CONTROL API 508 | OTHER API 514 | ........ |
| MODULES | WIRELESS MOBILE COMMUNICATION DEVICE MODULE 504 | ACCESS CONTROL MODULE 510 | OTHER MODULES 516 | ........ |
| DRIVERS | WIRELESS MOBILE COMMUNICATION DEVICE DRIVER 506 | ACCESS CONTROL DRIVERS 512 | OTHER DRIVERS 518 | ........ |

FIG. 5

MOBILE COMMUNICATION DEVICE SURVEILLANCE SYSTEM

TECHNICAL FIELD

This application relates generally to the field of computer technology, and in a specific example embodiment, a surveillance system for a mobile communication device.

BACKGROUND

Systems for monitoring and/or controlling security devices have become increasingly popular in recent years. Such systems are used to communicate with security devices such as lights, thermostats, or security systems.

Some conventional systems for controlling and monitoring security devices allow a user to access a server from a remote location using a device such as a desktop computer. For example, a user can use a desktop computer located in a remote location to connect with the server. The user can then send commands to the server to control various security devices. For example, the user can turn lights on or off. In another example, the user accesses a video feed stored at the server that receives a video stream from a camera at a monitored location.

Such conventional systems for controlling and/or monitoring security devices have at least the following disadvantages and limitations. The connection between the user's remote computer and the server may not be secured. A user could establish a secure connection, but the cost and complexity involved in establishing such a connection are high. Such systems are also complex for users to implement and maintain. For example, the server may be difficult to install and configure. Programming such systems can also be cumbersome and require custom configurations when adding supplemental security devices or services. Last, it is difficult for the user to access the server using different types of remote devices. For instance, conventional systems only allow a user to access the offsite server using, for example, a secured desktop computer located in the user's workplace.

BRIEF DESCRIPTION OF THE DRAWINGS

The present invention is illustrated by way of example, and not by way of limitation, in the figures of the accompanying drawings in which:

FIG. 5 is a block diagram illustrating another example embodiment of a gateway;

DETAILED DESCRIPTION

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

In various embodiments, a mobile communication device surveillance system is described. The system includes a gateway, a web server, a wireless mobile communication device, and a client device. The web server introduces the wireless mobile communication device to a gateway. The gateway authenticates the wireless mobile communication device. The gateway receives media data from the wireless mobile communication device and monitoring data from a security device connected to the gateway. The gateway aggregates the media data and the monitoring data, and communicates the aggregated data to the client device authenticated with the gateway. The media data includes audio data generated from a microphone of the wireless mobile communication device and/or video data generated from a camera of the wireless mobile communication device.

In one embodiment, the gateway communicates the monitoring data to the wireless mobile communication device and controls the security device in response to a request from the wireless mobile communication device.

In another embodiment, the gateway receives a geographic location data of the wireless mobile communication device and maps the aggregated data based on the geographic location data.

Figure 1:
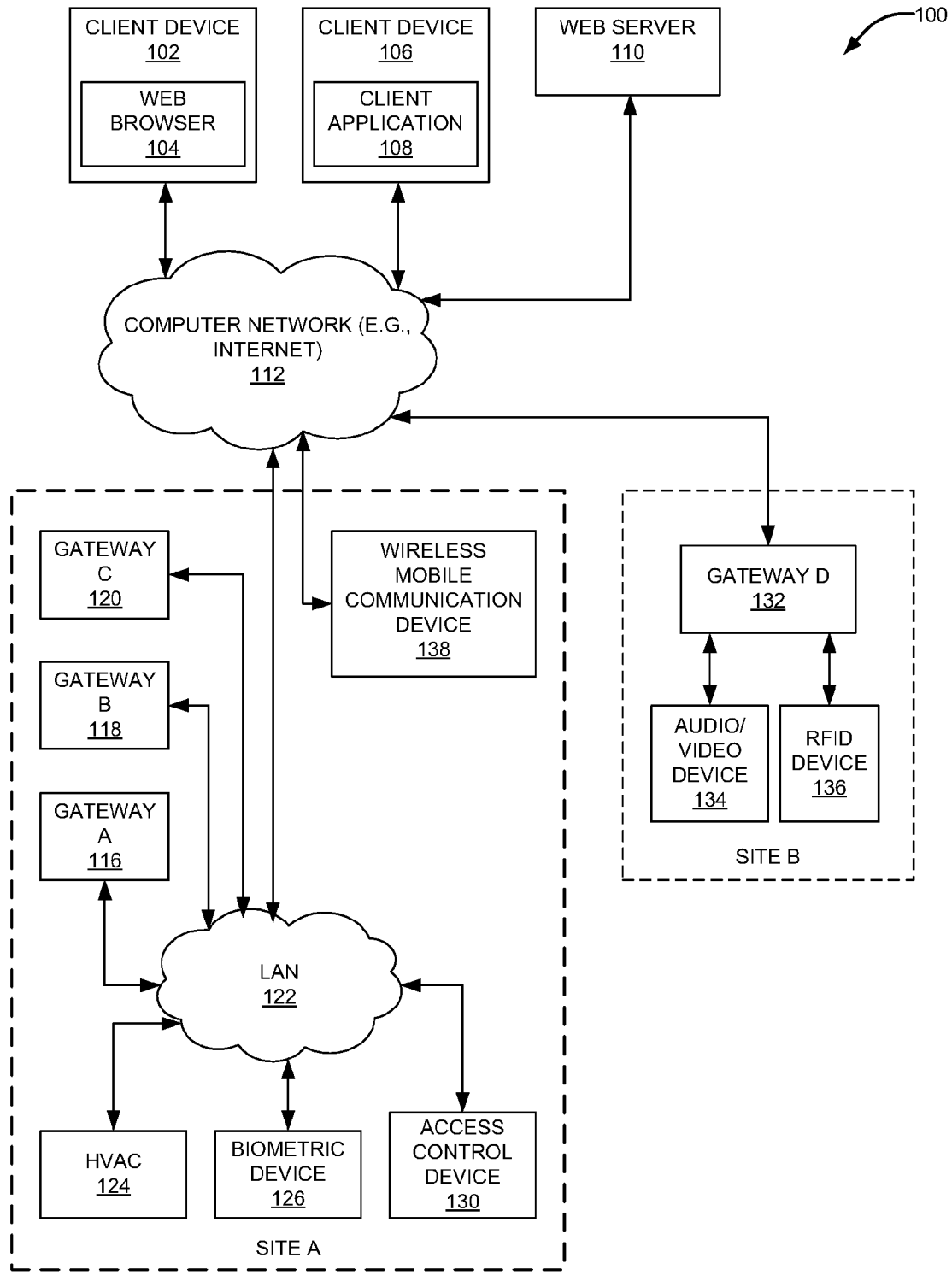
FIG. 1 is a network diagram depicting a network system, according to one embodiment, for exchanging data over a network.

FIG. 1 is a network diagram depicting a network system 100, according to one embodiment, for exchanging data over a computer network 112 (e.g. TCP/IP network). For example, the network system 100 comprises client devices 102, 106, a web server 110, gateways 116, 118, 120 and a wireless mobile communication device 138 at a location site A, and a gateway 132 at a location site B. For example, location site A may be a retail store in a city and location site B may be an office space in another city. A location site may include, for example, one or more floors of an office building, a residential house, an area of a factory or retail space, and so forth. In another example, location sites may overlap each other.

For purposes of the present embodiment, the terms "sites" and "premises" refer to any location to be monitored, whether residential, commercial, public, or secured. Further, the term "a" is generally used in the present disclosure to mean one or more. Still further, the terms "coupled" and "operatively coupled" mean connected in such a way that data may be exchanged. It is understood that "coupled" and "operatively coupled" do not require a direct connection, a wired connection, or even a permanent connection. It is sufficient for purposes of the present embodiment that the connection(s) be established for the sole purpose of exchanging information.

The wireless mobile communication device 138 and the client devices 102, 106 are connected to the computer network 112. The wireless mobile communication device 138 includes, for example, a smart phone with a camera. The client devices 102, 106 can include, but are not limited to, a desktop computer, a laptop computer, a mobile computing device, and the likes. A network interface means in the client devices 102, 106 and the wireless mobile communication device 138 enable them to send and receive data to and from the computer network 112. The wireless mobile communication device 138 may communicate indirectly via a cellular tower signal, directly via a wi-fi signal, or via other means to the network 112.

The client device 102 may include a web browser 104 that may be in communication with the web server 110 via the computer network 112. In another example, the client device 106 includes a programmatic client, such as a client application 108 configured to communicate with the web server 110 via the computer network 112. The web browser 104 or the client application 108 may be used to display some or all of the information and monitoring data provided by gateways 116, 118, 120, and 132.

The wireless mobile communication device 138 may include a web browser, a client application, or a mobile application (app) configured to access the web server 110 via the computer network 112, and to communicate with corresponding gateways. The wireless mobile communication device 138 may be located at a site corresponding to a gateway (e.g., site A corresponding to gateways A 116) or outside a site.

The computer network 112 can include a local area network (LAN) where Gigabit Ethernet switches are used to switch data. In another example, the computer network 112 includes a wide area network, such as the Internet. In general, computer network 112 may be a public network or private network, a single network or a combination of several networks. In most embodiments, computer network 112 may be, but is not required to be, an IP-based network. In some embodiments it may be desirable for all or a portion of network 112 to include publicly available networks, such as the Internet, to avoid the need for installing, purchasing, or leasing additional infrastructure.

The web server 110 may also connect to the computer network 112 both to receive and transmit data. The web server 110 may also be referred to as a web-based host. The web server 110 is connected to the computer network 112 by a means of a network interface. The network interface can take the form of a network interface card (not shown) installed within the web server 110 to enable data to sent and received to and from the computer network 112 by the web server 110.

In one embodiment, the web server 110 identifies one or more gateway(s) for the wireless mobile communication device 138 and the client devices 102, 106 to communicate with, so as to monitor and/or control the security devices connected to the corresponding gateway(s).

In one embodiment, the web server 110 may provide server-side functionality, via the computer network 112, to the wireless mobile communication device 138 and the client devices 102, 106. The wireless mobile communication device 138 and the client devices 102, 106 may enable users that utilize the network system 100 and more specifically, the web server 110, to view monitoring data (e.g. audio/video feed) from security devices connected to gateways 116, 118, 120, and 132 over the computer network 112. These transactions may include transmitting, receiving (communicating) and processing data to, from, and regarding monitoring data and users of the network system 100. The data may include, but are not limited to, audio, video, picture, metadata, camera configuration data, client device configuration data, and network data monitoring data. The web server 110 can provide other functions including storing monitoring data to an internal or external disk storage device (not shown), playing back recorded monitoring data.

In another embodiment, the web server 110 may provide server-side functionality, via the computer network 112, to the client devices 102, 106. The client devices 102, 106 may enable users that utilize the network system 100 and more specifically, the web server 110, to view monitoring data (e.g. audio/video feed, lock status, etc . . . ) from the camera of the wireless mobile communication device 138 over the computer network 112.

In one embodiment, the web server 110 may include a directory of gateways and the location of corresponding connected security devices. The web server 110 is described in more detail below with respect to FIG. 7. As such, the web server 110 may correlate the gateway 116 at site A to the gateway 132 at site B. In one embodiment, the correlation may be generated pursuant to pre-defined settings or configuration based on user profile, organization topology, hierarchy, bandwidth and other factors. For example, a user at client device 102 may be a manager responsible for stores located on the West coast. If both sites A and B are on the West coast, the web server correlates gateway 116 to gateway 132. As such, based on the user profile and the organization topology, the user can access only gateway 116 to obtain monitoring data from sites A and B. In other words, the user does not have to communicate directly with several gateways to monitor all security devices attached to the corresponding gateways. In another embodiment, the web server 110 may correlate gateway 116 with other gateways. In yet another embodiment, the other gateways may be correlated with other gateways. For example, information from other gateways correlated with the gateway 132 which is correlated with gateway 116 may be communicated with the user at the client device 102 or 106.

Generally, gateways 116, 118, 120, and 132 include a processor-based device that operate to monitor conditions at a target site or premise, to analyze monitoring data, to detect alarm conditions at the target site or premise, to capture information relating to such alarm conditions, and to send such monitoring information to client devices 102, 106 and/or the web server 110.

Gateways 116, 118, and 120 are located at the same site A. In one embodiment, gateways 116, 118, 120 are capable of balancing their respective load. Furthermore, gateways 116, 118, 120 may provide a redundant backup of each other. Gateways 116, 118, 120 are connected to a local area network LAN 122. In another embodiment, gateways 116, 118, 120 communicate with one another via a peer-to-peer network.

Security devices (e.g. monitoring devices and controlling devices) 124, 126, and 130 are connected to the gateways 116, 118, 120 via LAN 122. Monitoring devices include, for example, sensors. The gateways are not limited to connect to any specific type or model of sensors or monitoring devices. Any sensor may be used, depending on the desired type and level of protection. Examples include, without limitation, microphones, cameras, magnetic contact switches, audio sensors, infrared sensors, motion detectors, fire alarms, and carbon monoxide sensors. For illustration purposes, location site A in FIG. 1 includes a biometric device 126 (e.g. fingerprint reader), and an access control device 130 (e.g. door/gate access sensor).

In addition, controlling devices may include devices that can be controlled such as a HVAC system 124 (e.g. heater/air conditioning system including thermometer, smoke sensor, thermostat), a gate/door lock, a camera positioning system (e.g. tilt, pan).

The HVAC system 124, the biometric devices 126, and the access control device 130 are located at site A and are connected to the gateway 116 via LAN 122.

The gateway 132 is located at another location site B away from location site A (e.g. different physical locations). An audio/video device 134 (e.g. camera, microphone) and an RFID device 136 (e.g. card reader) are directly connected to gateway 132. The gateway 132 communicates with the computer network 112.

In another embodiment, gateways 116, 118, and 120 from site A communicate with the gateway 132 from site B. As such, client devices 102, 106 can monitor data from audio/video device 134 and RFID device 136 connected to the gateway 132 by communicating only with the gateway 116. Similarly, client devices 102, 106 can monitor data from the HVAC 124, the biometric device 126, and the access control device 130 connected to gateway 116 by communicating only with the gateway 132.

Figure 2:
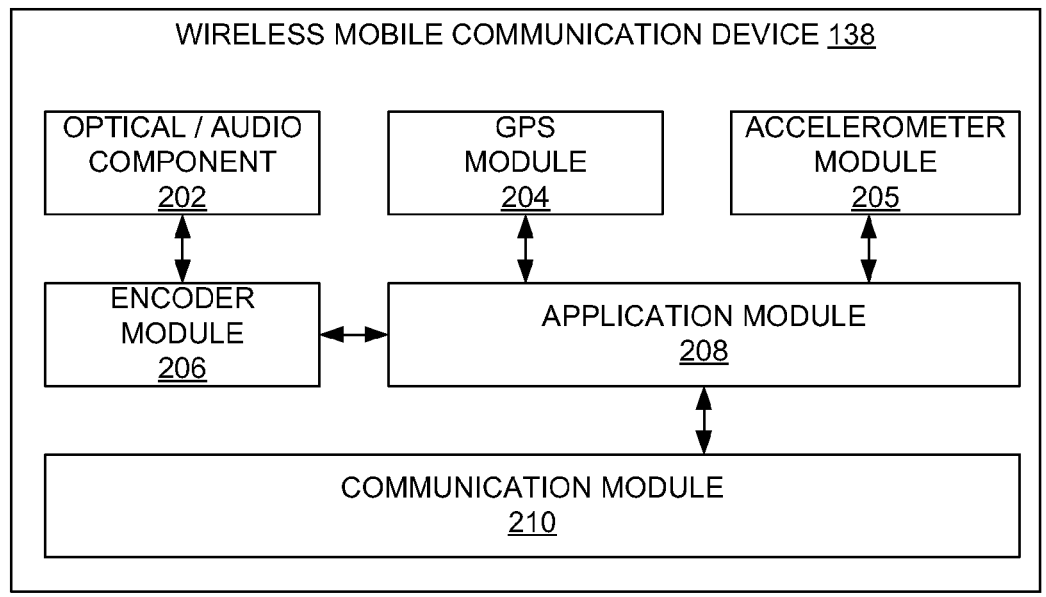
FIG. 2 is a block diagram illustrating an example embodiment of a wireless mobile communication device.

FIG. 2 is block diagram of an example embodiment of the wireless mobile communication device 138. The wireless mobile communication device 138 includes an optical/audio component 202, a gps module 204, an accelerometer module 205, an encoder 206, an application module 208, and a communication module 210.

The optical/audio component 202 includes, for example, an optical device such as a camera lens for capturing a picture or video data and/or a microphone for capturing sound. The optical/audio component 202 may capture an analog or digital video and/or audio data. The video and audio data are captured by the optical/audio component 202 in raw format. The encoder module 206 receives the raw video/audio and is configured to encode the video in a variety of formats (MPEG 2, MPEG4, MP3, etc . . . ). The communication module 210 communicates the encoded media data (audio data and/or video data) to a corresponding gateway. The communication module 210 may include a network interface configured to communicate with the computer network 112 of FIG. 1. The GPS module 204 comprises a location detection component configured to determine a geographic location of the wireless mobile communication device 138. The location data generated by the GPS module 204 is associated with the encoded video data from the encoder module 206. The accelerometer module 205 determines a direction and movement of wireless mobile communication device 138 and generates a motion data. In one embodiment, the motion data may also be included in the media data as meta data.

The application module 208 enables the wireless mobile communication device 138 to authenticate a user with the web server 110 and corresponding gateways introduced by the web server 110. The application module 208 allows a user at the wireless mobile communication device 138, upon authentication, to monitor security devices associated with a gateway. In another embodiment, the application module 208 allows the user at the wireless mobile communication device 138 to record video/audio and stream the media data to the corresponding gateway.

Figure 3:
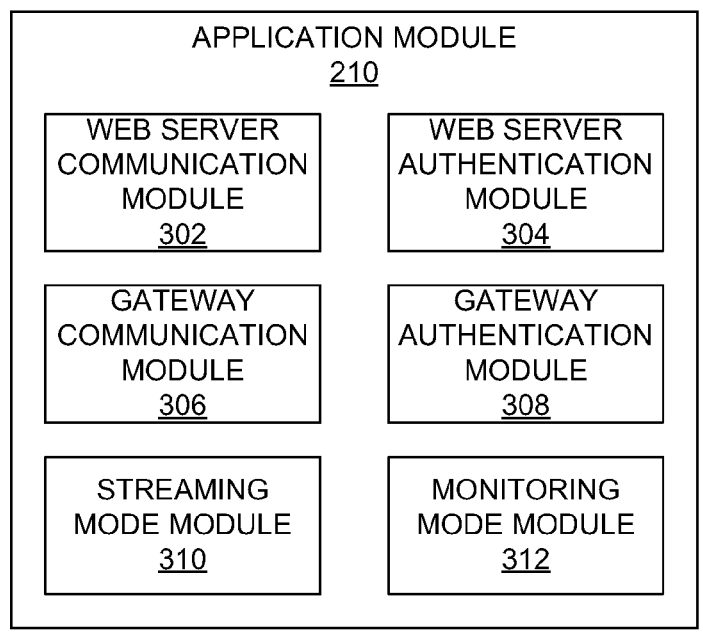
FIG. 3 is a block diagram illustrating an example embodiment of an application in the wireless mobile communication device.

FIG. 3 illustrates an example embodiment of the application module 210. The application module 210 includes a web server communication module 302, a web server authentication module 304, a gateway communication module 306, a gateway authentication module 308, a streaming mode module 310, and a monitoring mode module 312. The web server communication module 302 is configured to enable the wireless communication device 138 to contact and communicate with the web server 110. The web server authentication module 304 authenticates a user of the wireless mobile communication device 138 with the Web server 110. Upon successful authentication, the web server 110 introduces the wireless mobile communication device 138 to a corresponding gateway associated with the user or with the wireless mobile communication device 138. The gateway communication module 306 is configured to enable the wireless mobile communication device 138 to communicate with the corresponding gateway. The gateway authentication module 308 authenticates a user of the wireless mobile communication device 138.

The streaming mode module 310 enables a user of the wireless mobile communication device 138 to capture media (e.g., video/audio) data with the wireless mobile communication device 138 and stream the video/audio data to the corresponding gateway.

The monitoring mode module 312 enables a user of the wireless mobile communication device 138 to monitor and control security devices connected to the corresponding gateway.

Figure 4:
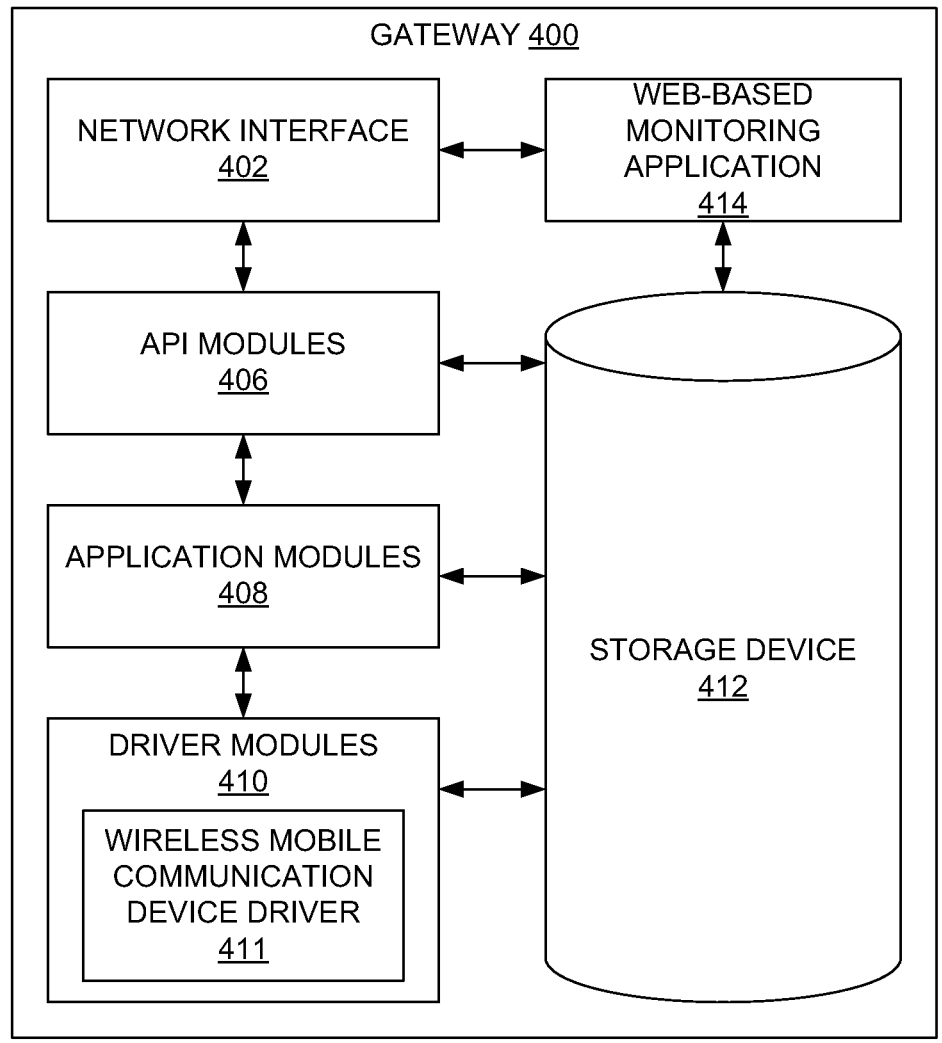
FIG. 4 is a block diagram illustrating an example embodiment of a gateway.

FIG. 4 is a block diagram illustrating an example embodiment of a gateway 400. The gateway 400 includes a network interface 402, API modules 406, application modules 408, driver modules 410, a web-based monitoring application 414, and a storage device 412. The network interface 402 enables the gateway 400 to communicate with the computer network 112. The application programming interface (API) modules 406 enable the gateway 400 to interface the gateway 400 with the wireless mobile communication device 138, the client devices 102, 106, the web server 110, and other third party devices (not shown). The application modules 408 enable the gateway 400 to monitor or control the corresponding monitoring or controlling devices connected to the gateway 400. In addition, the application modules 408 enable the gateway 400 to provide add-on expandable services discussed further below. The driver modules 410 include device drivers to enable interaction of the application modules 408 with the hardware of the corresponding monitoring or controlling devices. In one embodiment, the driver modules 410 includes a wireless mobile communication device driver 411 configured to interface with the camera of the wireless mobile communication device 138.

The web-based monitoring application 414 enables the gateway 400 to communicate monitoring and controlling data to and from the client devices. The web-based monitoring application 414 is discussed in more detail with respect to FIG. 6. The storage device 412 may be used to store video data from the wireless mobile communication device 138, monitoring data from the monitoring devices connected to the gateway 400, APIs from API modules 406, software application from application modules 408, device drivers from driver modules 410, and a configuration of the gateway 400. For example, the configuration of the gateway 400 may include a topology or hierarchy of at a user level, organization level, partner level. The configuration of the gateway may include specifically an enterprise configuration of gateway (based on the topology/hierarchy previously mentioned). In one embodiment, the configuration of the gateway 400 may be replicated to other gateways that are correlated by the web server based on the topology/hierarchy. For example, some gateway can have access control to a limited number of security devices. In another embodiment, each gateway may be custom configured. In another embodiment, the gateway 400 is configured to aggregate data from multiple gateways (that may be correlated by the web server 110 based on the topology) and present the aggregated data to the client device.

FIG. 5 is a block diagram illustrating another example embodiment of a gateway 500. For example, the gateway 500 includes a wireless mobile communication device API 502, a wireless mobile communication device module 504, and a wireless mobile communication device driver 506. The wireless mobile communication device API 502 provides an interface to the web browser 104 or the client application 108 of the client device 106 to receive and send data from the wireless mobile communication device associated with the gateway 500. The wireless mobile communication device module 504 enables the client device 106 to receive data (e.g. audio and/or video) from the camera of the wireless mobile communication device via the wireless mobile communication device API 502. In another embodiment, the wireless mobile communication device application module 504 enables the client device 106 to send requests (e.g. focus, tilt, pan, zoom) to the wireless mobile communication device via the wireless mobile communication device API 502. The wireless mobile communication device driver 506 includes one or more drivers for different brand or manufacturer of wireless mobile communication devices.

In another example, the gateway 200 also includes an access control API 508, an access control application module 510, and access control drivers 512. The access control API 508 provides an interface to the web browser 104 or the client application 108 of the client device to receive and send data from an access control device (e.g. a door access at a monitored site) connected to the gateway 500. The access control module 510 enables the client device to receive data (e.g. time and ID log of the door access at the monitored site) from the access control device via the access control API 508. In another embodiment, the access control module 510 enables the client device to send data to the access control device (e.g. open, close, lock door) to the access control device via the access control API 508. The access control drivers 512 include one or more drivers for different brand or manufacturer of access control devices.

One advantage of one of the embodiments of the gateway 500 is the ability to easily connect additional devices or third party devices. This is illustrated with respect to other APIs 514, other module 516, and other drivers 518. As such, the gateway 500 is not limited to any particular manufacturer of devices or brand of devices. The gateway 500 allows for easy expansion and plug-in features using additional APIs, corresponding modules, and corresponding device drivers.

Figure 6:
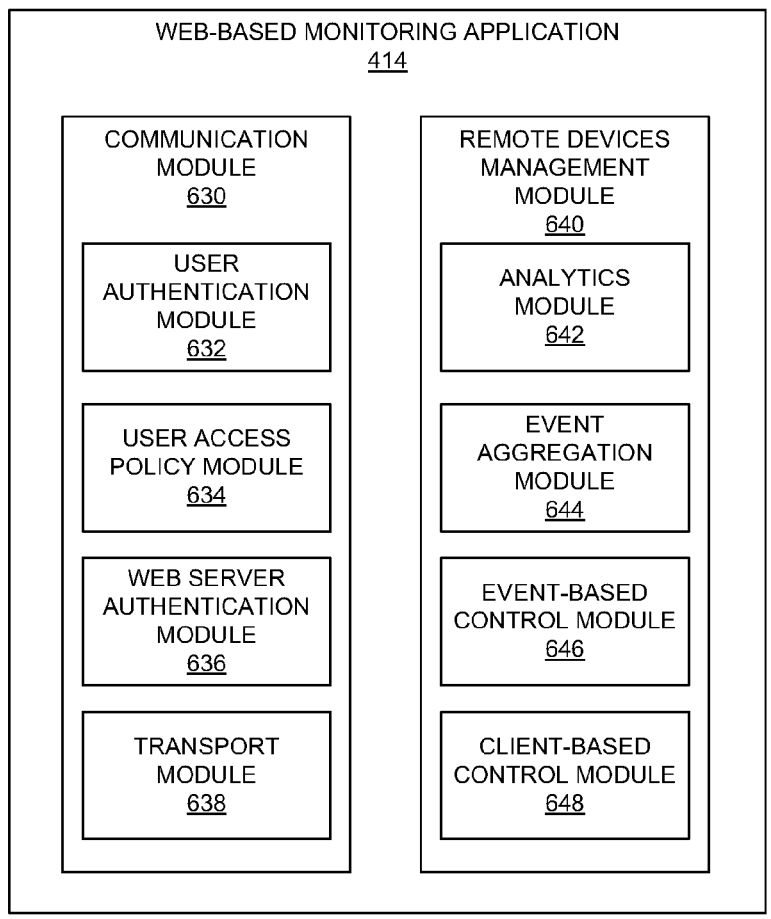
FIG. 6 is a block diagram illustrating an example embodiment of a web-based monitoring application of a gateway.

FIG. 6 is a block diagram illustrating an example embodiment of the web-based monitoring application 414 of the gateway 400. The web-based monitoring application 414 enables client devices to remotely monitor and control monitoring and controlling devices connected to the gateway 400 via the web browser 104 or the client application 108 at the client devices 102, 106.

In one embodiment, the web-based monitoring application 414 includes a communication module 630 and a remote devices management module 640. The communication module 630 enables communication between the gateway 400 and the client devices 102, 106. The remote devices management module 640 enables the client devices 102, 106 to monitor or control the monitoring or controlling devices connected to the gateway 400.

For example, the communication module 630 includes a user authentication module 632, a user access policy module 634, a web server authentication module 636, and a transport module 638.

The user authentication module 632 authenticates a user at the client device or at a wireless mobile communication device based on a user profile of the user. An example of user authentication may include verifying the username and password provided by the wireless mobile communication device with a predefined user profile. The predefined user profile may be stored in the storage device 412 or at the web server 110.

The user access policy module 634 limits or grants the user at the client device or at the wireless mobile communication device access to the monitoring and/or controlling devices connected to the gateway. For example, a user with limited privilege may have access to the monitoring data to a particular site (e.g. first floor only) or a specific monitoring device (e.g. HVAC only). On the other hand, a user with executive privilege may not only be able to view monitoring data and control security devices from more sites.

The web server authentication module 636 authenticates a communication between the gateway 400 and the web server 110. For example, the gateway transmits a unique token to the web server 110 for authentication prior to establishing the secured communication. Those of ordinary skills in the art will recognize that other means of authentication between the gateway and the web server 110 may be used.

The transport module 638 enables peer-to-peer communication between gateways. As such, a client device communicating with one gateway at a first location is also able to communicate with another gateway at a second location.

For example, the remote device management module 640 of the web-based monitoring application 414 includes an analytics module 642, an event aggregation module 644, an event-based control module 646, and a client-based control module 648.

The analytics module 642 analyzes audio/video, and other detected changes from the monitoring devices and generates events based on the analysis. For example, the analytics module 642 is capable of determining how many people have entered or left an activity zone (e.g. a room, a hallway) in a video feed, the direction of the movement of individuals in a video feed, the temperature of individuals in a video feed, facial recognition of individual in a video feed, and so forth. Events are generated based on the analysis and predefined user-configured settings. A user at the client device is able to configure the conditions for generating an event from the web browser 104 of the client device 102 or the client application 108 of the client device 106.

The event aggregation module 644 aggregates events generated from the analytics module 642. For example, events generated based on the analysis and predefined/user-configured settings are aggregated in a log stored in a storage device attached to the gateway, in a storage device attached to another gateway, in a storage device attached to the web server 110, or in a storage device connected to the client device.

The event-based control module 646 communicates a command to at least one controlling device connected to the corresponding gateway based on an event identified in event aggregation module 644 based on an event configuration. For example, an event comprises a temperature of a room reaching a predefined maximum temperature. The event-based control module 646 may communicate to the HVAC system to turn on the air conditioning system for the room if such event occurs.

The client-based control module 648 communicates a command to one or more controlling devices of the corresponding gateway based on a command initiated and communicated from the client device. For example, a user at the client device or at a wireless mobile communication device may initiate a command to pan a camera connected to the gateway. Such command would be communicated to the camera via the client-based control module 648.

Figure 7:
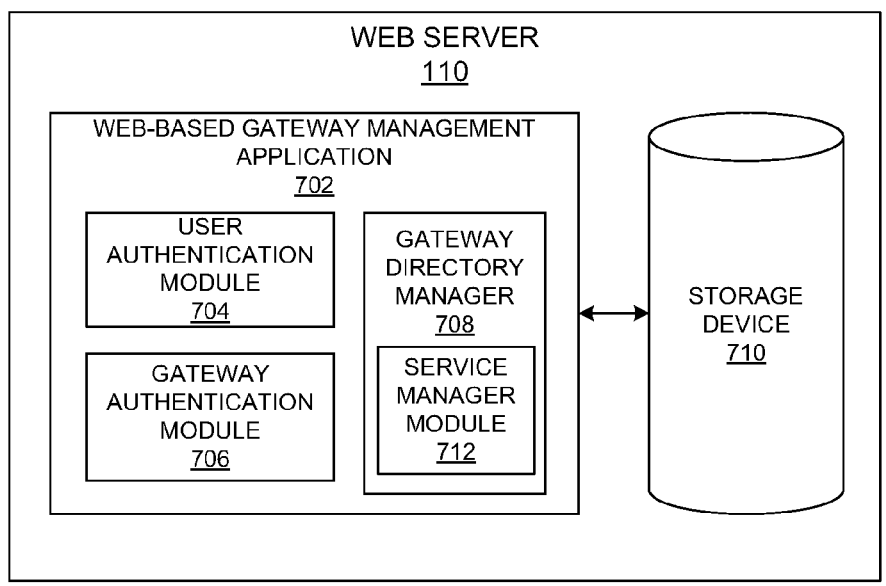
FIG. 7 is a block diagram illustrating an example embodiment of a web server.

FIG. 7 is a block diagram illustrating an example embodiment of a web server 110 also referred to as a web-based host. The web server 110 comprises a web-based gateway management application 702 and a storage device 710. The web-based gateway management application 702 identifies a gateway associated with a user at the client device or the wireless mobile communication device, authenticates with the user at the client device or the wireless mobile communication device, and authenticates with the identified gateway.

In one embodiment, the web-based gateway management application 702 includes a gateway directory manager 708, a user authentication module 704, and a gateway authentication module 706. The gateway directory manager 708 identifies a gateway associated with a user profile. For example, a user may only be able to access a particular gateway or a particular set of devices connected to a gateway. As such, a west coast manager of an organization may be able to access monitored sites only from west coast stores of the organization. In contrast, a user with higher privileges may be able to access more gateways and devices. As such, the CEO of an organization with stores throughout the U.S. may be able to view monitoring data from all the stores in the U.S.

In another embodiment, the gateway directory manager 708 includes a service manager module 712 to enable add-on services to the user at the client device. For example, the add-on services include, but are not limited to, remote storage, remote audio, two-way audio, dynamic backup, or reporting based on the user profile.

The user authentication module 704 authenticates the web server 110 with the user at the client device or the wireless mobile communication device based on the user profile. For example, the web server 110 verifies the username and password of the user at the client device or the wireless mobile communication device.

The gateway authentication module 706 authenticates the identified gateway. For example, the web server 110 receives a unique token from the identified gateway to authenticate the identified gateway prior to establishing secured communication between the web server and the gateway.

The storage device 710 may be used to store user profiles, tokens from gateways, a directory of gateways with corresponding devices, services from the gateways, a directory of gateways associated with a user profile, and a directory of connected security devices associated with a user profile.

Figure 8:
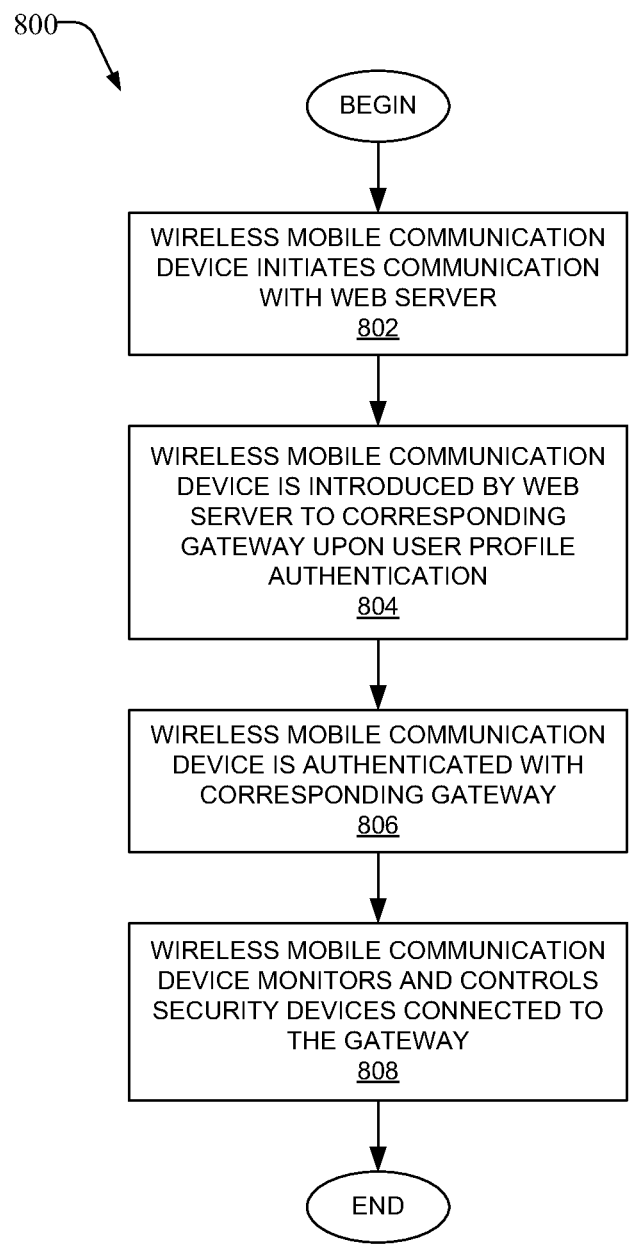
FIG. 8 is a flow diagram of an example embodiment of a method for monitoring and controlling devices associated and connected to a gateway from a wireless mobile communication device.

FIG. 8 is a flow chart 800 of one embodiment of an example method for monitoring and controlling devices attached to a gateway. At operation 802, a user at a wireless mobile communication device initiates communication with a web server to access monitoring data from the security devices connected to a corresponding gateway. At operation 804, the web server directs/introduces the client device to the corresponding gateway based on the user profile of the user at the wireless mobile communication device. At operation 806, the wireless mobile communication device is authenticated with the corresponding gateway. At operation 808, the wireless mobile communication device is able to monitor and control from a central interface, monitoring and controlling security devices connected to the identified gateway(s). In one embodiment, the wireless mobile communication device receives an aggregated view of all security devices from several correlated gateways by communicating with only one gateway.

Figure 9:
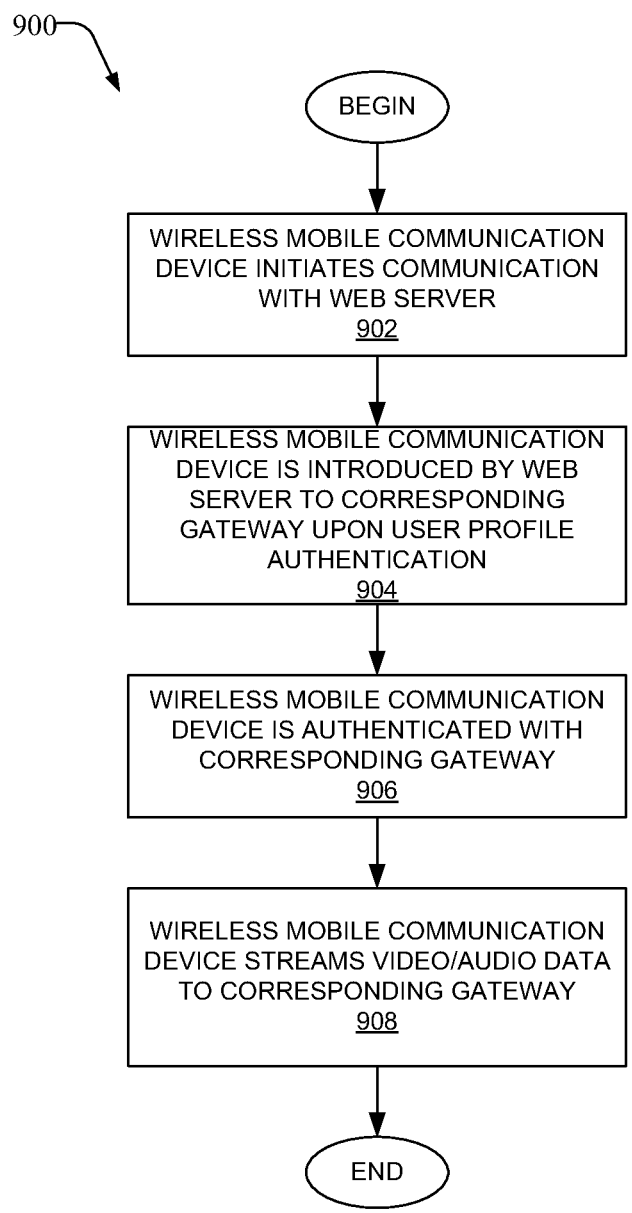
FIG. 9 is a flow diagram of an example embodiment of a method for sending video data from a wireless mobile communication device to a gateway.

FIG. 9 is a flow chart 900 of one embodiment of an example method for streaming video data from a wireless mobile communication device to a gateway. At operation 902, a wireless mobile communication device initiates a communication with a web server. At operation 904, the wireless mobile communication device is introduced to a corresponding gateway by the web server after authentication of a user at the wireless mobile communication device based on a user profile. At operation 906, the wireless mobile communication device communicates with the corresponding gateway(s) referred, identified by the web server and is authenticated by the corresponding gateway. At operation 908, the wireless mobile communication device streams video and/or audio data to the corresponding gateway. In another embodiment, the wireless mobile communication device can stream video and/or audio data to other correlated gateways.

Figure 10:
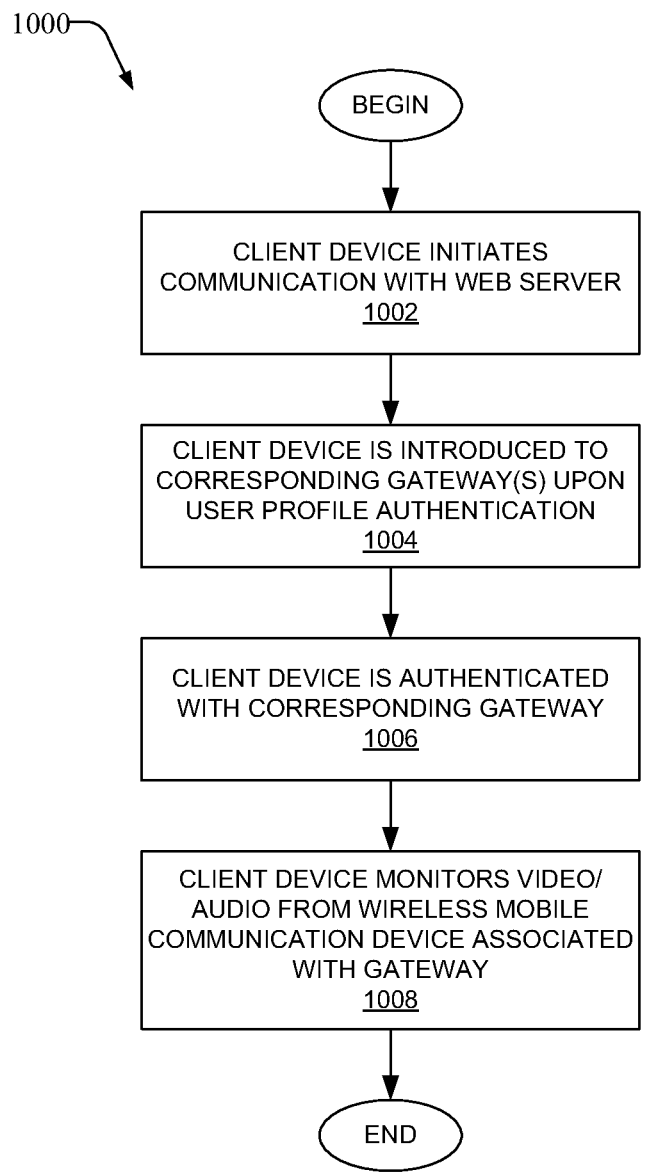
FIG. 10 is a flow diagram of an example embodiment of a method for monitoring and controlling devices associated and connected to a gateway from a client device.

FIG. 10 is a flow chart 1000 of one embodiment of an example method for monitoring video data from a wireless mobile communication device at a client device. At operation 1002, the client device initiates a communication with a pre-identified web server. At operation 1004, the client device is introduced to one or more corresponding gateway after authentication of the user at the client device. At operation 1006, the client device is authenticated with the corresponding gateway. At operation 1008, the client device monitors video and/or audio data from the wireless mobile communication device associated with the gateway.

Figure 11:
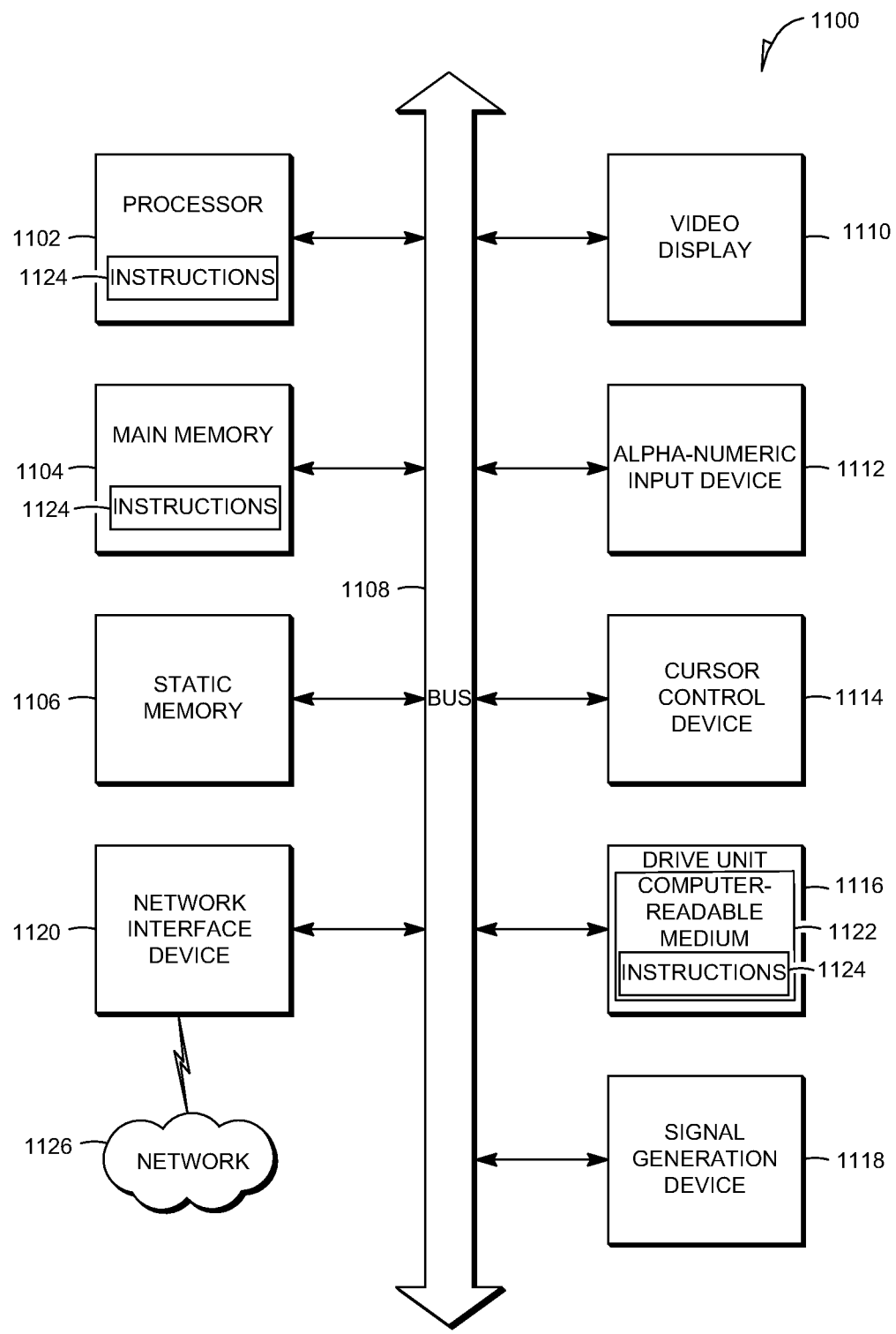
FIG. 11 shows a diagrammatic representation of machine in the example form of a computer system within which a set of instructions may be executed to cause the machine to perform any one or more of the methodologies discussed herein.

FIG. 11 shows a diagrammatic representation of machine in the example form of a computer system 1100 within which a set of instructions may be executed causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU) or both), a main memory 1104 and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard), a user interface (UI) navigation device 1114 (e.g., a mouse), a disk drive unit 1116, a signal generation device 1118 (e.g., a speaker) and a network interface device 1120.

The disk drive unit 1116 includes a machine-readable medium 1122 on which is stored one or more sets of instructions and data structures (e.g., software 1124) embodying or utilized by any one or more of the methodologies or functions described herein. The software 1124 may also reside, completely or at least partially, within the main memory 1104 and/or within the processor 1102 during execution thereof by the computer system 1100, the main memory 1104 and the processor 1102 also constituting machine-readable media.

The software 1124 may further be transmitted or received over a network 1126 via the network interface device 1120 utilizing any one of a number of well-known transfer protocols (e.g., HTTP).

While the machine-readable medium 1122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical media, and magnetic media.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A gateway comprising:
    a communication module configured to communicate with a wireless mobile communication device associated with the gateway, the wireless mobile communication device authenticated with a remote web server prior to communicating with the gateway, the remote web server configured to identify the gateway associated with the wireless mobile communication device based on the authentication of the wireless mobile communication device, to introduce the wireless mobile communication device to the gateway after identifying the gateway, and to communicate with the wireless mobile communication device without accessing the gateway associated with the wireless mobile communication device, the wireless mobile communication device having an optical component and a microphone for generating media data; and
    a remote device management module configured to aggregate the media data from the wireless mobile communication device and monitoring data generated by a security device coupled to the gateway, and to communicate the aggregated data to a client device.

2. The gateway of claim 1, wherein the remote device management module is configured to communicate the aggregated data to the wireless mobile communication device, and to control the security device in response to a request from the wireless mobile communication device.

3. The gateway of claim 1, wherein the communication module is configured to receive a geographic location data of the wireless mobile communication device, wherein the remote device management module is configured to map the aggregated data based on the geographic location data.

4. The gateway of claim 1, further comprising:
    an application programming interface (API) configured to interface the gateway with the wireless mobile communication device;
    an application module configured to receive the video data and the monitoring data; and
    a device driver to enable interaction of the application module with the wireless mobile communication device and the security device.

5. The gateway of claim 4, wherein the communication module is configured to communicate with other gateways, to receive additional APIs, respective application modules, and respective device drivers, and to copy a configuration of the gateway to the other gateways.

6. The gateway of claim 5, wherein the communication module comprises:
    a user authentication module configured to authenticate a user at the wireless mobile communication device based on a profile of the user at the wireless mobile communication device;
    a user access policy module configured to limit or grant the user at the wireless mobile communication device access to the security device;
    a web server authentication module configured to authenticate a communication between the gateway and the web server; and
    a transport module configured to enable peer-to-peer communication between gateways, the wireless mobile communication device, and the web server.

7. The gateway of claim 6, wherein the remote device management module comprises:
    an analytics module configured to analyze the aggregated data and to generate events based on the analysis;
    an event aggregation module configured to aggregate events generated from the analytics module;
    an event-based control module configured to communicate a command to the wireless mobile communication device and the security device based on an event identified in the aggregated events based on an event configuration; and
    a client-based control module configured to communicate a command the security device of the gateway based on a command communicated from the wireless mobile communication device.

8. The gateway of claim 1, wherein the security device comprises a camera controlled device, an audio control device, a switch, a HVAC system, a video device, an audio device, a biometric sensor, an access control device, a temperature sensor, an RFID device, or a motion-controlled sensor.

9. The gateway of claim 1, wherein the web server comprises a web-based gateway management application configured to identify a gateway associated with a user at the wireless mobile communication device, to authenticate with the user at the wireless mobile communication device, to authenticate with the identified gateway, and to correlate the identified gateway with the other gateways.

10. The gateway of claim 9, wherein the web-based gateway management application comprises:
    a gateway directory manager configured to identify a gateway associated with a user profile;
    a user authentication module configured to authenticate with the user at the wireless mobile communication device based on the user profile; and a gateway authentication module configured to authenticate the identified gateway, wherein the gateway directory manager comprises a service manager module configured to enable an add-on service to the user at the wireless mobile communication device.

11. The gateway of claim 1, wherein the media data comprises a video data or an audio data.

12. The gateway of claim 1, wherein the client device is configured to communicate with a first gateway identified by the web server, to receive monitoring data from a second security device coupled to a second gateway, to control the second security device coupled to the second gateway by communicating with the first gateway coupled to a first security device, the first gateway correlated with the second gateway by the web server.

13. A system comprising:
a remote web server configured to authenticate a wireless mobile communication device having an optical device and a microphone for generating media data, to identify a gateway associated with the wireless mobile communication device based on the authentication of the wireless mobile communication device, to introduce the wireless mobile communication device to theag teway after identify in the gateway, the remote web server configured to communicate with the wireless mobile device without accessing the gateway associated with the wireless mobile communication device; and the gateway configured to authenticate the wireless mobile communication device, to aggregate monitoring data from a security device coupled to the gateway and media data from the wireless mobile communication device, and to communicate the aggregated data to a client device.

14. The system of claim 13, wherein the gateway is configured to communicate the monitoring data to the wireless mobile communication device, and to control the security device in response to a request from the wireless mobile communication device.

15. The system of claim 13, wherein the gateway is configured to receive a geographic location data of the wireless mobile communication device and to map the aggregated data based on the geographic location data.

16. The system of claim 13, wherein the gateway comprises:
an application programming interface (API) configured to interface the gateway with the wireless mobile communication device;
an application module configured to receive the video data and the monitoring data; and
a device driver to enable interaction of the application module with the wireless mobile communication device and the security device.

17. A computer-implemented method comprising:
authenticating, at a remote web server, a wireless mobile communication device;
identifying, at the remote web server, a gateway associated with the wireless mobile communication device based on the authenticating of the wireless mobile communication device;
introducing, at the remote web server, the wireless mobile communication device to the gateway after identifying the gateway, the remote web server configured to communicate with the wireless mobile device without accessing the gateway associated with the wireless mobile communication device;
authenticating, at the gateway, the wireless mobile communication device;
receiving, at the gateway, media data from the wireless mobile communication device and monitoring data from a security device coupled to the gateway;
aggregating, at the gateway, the media data and the monitoring data; and
communicating, from the gateway, the aggregated data to a client device authenticated with the gateway.

18. The computer-implemented method of claim 17, further comprising:
communicating the aggregated data to the wireless mobile communication device.

19. The computer-implemented method of claim 18, further comprising:
controlling the security device in response to a request from the wireless mobile communication device.

20. A non-transitory computer-readable storage medium storing a set of instructions that, when executed by a processor, cause the processor to perform operations, comprising:
authenticating, at a remote web server, a wireless mobile communication device;
identifying, at the remote web server, a gateway associated with the wireless mobile communication device based on the authenticating of the wireless mobile communication device;
introducing, at the remote web server, the wireless mobile communication device to the gateway after identifying the gateway, the remote web server configured to communicate with the wireless mobile device without accessing the associated with the wireless mobile communication device;
authenticating, at the gateway, the wireless mobile communication device;
receiving, at the gateway, media data from the wireless mobile communication device and monitoring data from a security device coupled to the gateway;
aggregating, at the gateway, the media data and the monitoring data; and
communicating, from the gateway, the aggregated data to a client device authenticated with the gateway.

* * * * *